(12) United States Patent
Kubon et al.

(10) Patent No.: US 10,674,055 B2
(45) Date of Patent: Jun. 2, 2020

(54) APPARATUS FOR DETECTING, READING, AND VERIFYING 1-D, 2-D, AND DPM SYMBOLOGIES

(71) Applicant: Omron Corporation, Kyoto (JP)

(72) Inventors: Dan Kubon, Newnan, GA (US); Raylon K. Vaughan, Renton, WA (US); David Naddor, Duluth, GA (US)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/115,241

(22) Filed: Aug. 28, 2018

(65) Prior Publication Data

US 2019/0068856 A1 Feb. 28, 2019

Related U.S. Application Data

(60) Provisional application No. 62/551,396, filed on Aug. 29, 2017.

(51) Int. Cl.
*H04N 5/225* (2006.01)
*H04N 5/235* (2006.01)
(Continued)

(52) U.S. Cl.
CPC ............. *H04N 5/2256* (2013.01); *G06K 7/00* (2013.01); *G06K 7/1413* (2013.01);
(Continued)

(58) Field of Classification Search
CPC .. H04N 5/2256; H04N 5/2254; H04N 5/2354; H04N 5/2251; H04N 5/2253;
(Continued)

(56) References Cited

U.S. PATENT DOCUMENTS 5,325,276 A * 6/1994 Sullivan ............. G06K 7/10722
362/223
5,408,084 A * 4/1995 Brandorff .......... G06K 7/10722
235/462.42
(Continued)

FOREIGN PATENT DOCUMENTS

| JP | 2008-310631 | 12/2008 |
|---|---|---|
| JP | 2009-015634 | 1/2009 |

OTHER PUBLICATIONS

International Search Report and Written Opinion for PCT Application No. PCT/US2018/048573 dated Dec. 20, 2018, 10 pages.

*Primary Examiner* — Abdelaaziz Tissire
(74) *Attorney, Agent, or Firm* — Morgan, Lewis & Bockius LLP

(57) ABSTRACT

Embodiments are disclosed of an apparatus including an illuminator. The illuminator includes an illumination dome having a wide end through which illumination is emitted, a narrow end with a camera opening, and a plurality of sidewalls. An annular light tray including a plurality of dome-light sources is positioned around a perimeter of the wide end so that light emitted by the plurality of light sources is directed toward an interior of the illumination dome. A set of low-angle light sources is positioned in each of the plurality of sidewalls. A camera is coupled to the illuminator, the camera's optics being optically coupled to an image sensor and to the camera opening. A controller is communicatively coupled to the illuminator and to the camera.

18 Claims, 5 Drawing Sheets

(51) Int. Cl.
G06K 7/14 (2006.01)
G06K 7/00 (2006.01)

(52) U.S. Cl.
CPC ......... *G06K 7/1417* (2013.01); *G06K 7/1443* (2013.01); *H04N 5/2251* (2013.01); *H04N 5/2253* (2013.01); *H04N 5/2254* (2013.01); *H04N 5/2354* (2013.01)

(58) Field of Classification Search
CPC .. G06K 7/1413; G06K 7/1443; G06K 7/1417; G06K 7/00
See application file for complete search history.

(56) References Cited

U.S. PATENT DOCUMENTS

| | | | |
|---|---|---|---|
| 7,877,003 B2 | 1/2011 | Dunn et al. | |
| 7,978,970 B2 | 7/2011 | Pastore | |
| 8,032,017 B2 | 10/2011 | Pastore | |
| 8,374,498 B2 | 2/2013 | Pastore | |
| 8,768,159 B2 | 7/2014 | Messina et al. | |
| 2005/0011956 A1 | 1/2005 | Carlson | |
| 2007/0090193 A1* | 4/2007 | Nunnink | G06K 7/10732 235/473 |
| 2008/0137324 A1* | 6/2008 | Pastore | G03B 15/06 362/16 |
| 2008/0170380 A1 | 7/2008 | Pastore | |
| 2011/0008035 A1* | 1/2011 | Messina | G02B 19/0023 396/200 |
| 2011/0084143 A1* | 4/2011 | Liou | G06K 7/12 235/462.42 |
| 2011/0290889 A1* | 12/2011 | Tamburrini | G06K 7/10881 235/470 |
| 2012/0119914 A1* | 5/2012 | Uchida | H02J 5/005 340/584 |
| 2015/0363619 A1 | 12/2015 | Lei | |
| 2016/0125216 A1* | 5/2016 | Lu | G06K 7/10742 235/462.06 |

\* cited by examiner

APPARATUS FOR DETECTING, READING, AND VERIFYING 1-D, 2-D, AND DPM SYMBOLOGIES

CROSS-REFERENCE TO RELATED APPLICATIONS

This application claims priority under 35 U.S.C. § 119(e) to U.S. Provisional Application No. 62/551,396, filed 29 Aug. 2017. The contents of the provisional application are hereby incorporated by reference in their entirety.

TECHNICAL FIELD

The disclosed embodiments relate generally to optical data acquisition devices and in particular, but not exclusively, to detecting, reading, and verifying multiple optical symbologies such as 1-D, 2-D, and direct part marking (DPM) bar code symbols.

BACKGROUND

Optical symbologies such as one-dimensional (1-D) or two-dimensional (2-D) codes are used in a wide range of applications. When a bar code symbol does not read, or does not read the correct data, an avalanche of errors can occur. These errors can cause inventory control issues, potentially create incorrect pricing, or create the inability to track and trace a product. Thus, major retailers and manufacturers outlets can penalize the label maker with a stiff monetary fine for every symbol that cannot be read correctly.

Bar code verification systems are essential in today's world, making it essential that the codes themselves are well printed or formed through printing, laser etching, or dot-peening. Many companies spot check for bar code quality as a bar code is being created, and many companies must verify all three types of symbols. Portable bar code verification systems do not exist that can properly verify all three types of bar code symbols. Portability is important because it allows for quality checks at the point of inception. Being able to verify the quality of these different types of bar code symbols with a single verifier is ideal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described of an apparatus and system for optical symbology reading. Specific details are described to provide an understanding of the embodiments, but one skilled in the relevant art will recognize that the invention can be practiced without one or more of the described details or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that appearances of "in one embodiment" or "in an embodiment" do not necessarily all refer to the same embodiment. Furthermore, the particular features, structures, or characteristics may be combined in any suitable manner in one or more embodiments.

Embodiments are described below of a handheld bar code verification reader designed to generate a video image of a bar code symbol printed onto a label stock or laser etched onto a plurality of materials or dot-peened onto a plurality of materials in accordance with strict industry bar code generation standards. Disclosed embodiments of this barcode verification reader can effectively capture any 1D/2D/Direct Part Marking (DPM) bar code image and send the resulting video image to a computer for processing. The disclosed barcode verification reader can also perform optical character recognition (OCR). The resulting bar code label quality is displayed on a computer screen. A portable computer is commonly used but is not a requirement.

The disclosed embodiments relate generally to bar code verification technology and in particular to a method and apparatus for capturing a bar code image through the use of a handheld device capable of verifying one-dimensional, two-dimensional and direct part marking (DPM) bar codes, and is specifically designed to follow ISO/IEC 15426-1: 2006(E), ISO/IEC 15426-2:2015(E), ISO 15415, ISO 15416, and ISO/IEC TR29158:2011(E) industry standards for bar code verification conformance. The described embodiments are designed to be handheld (i.e., portable) or mounted onto a special platform stand that can hold the verifier steady for use as a hands-free verification system.

Figure 1:
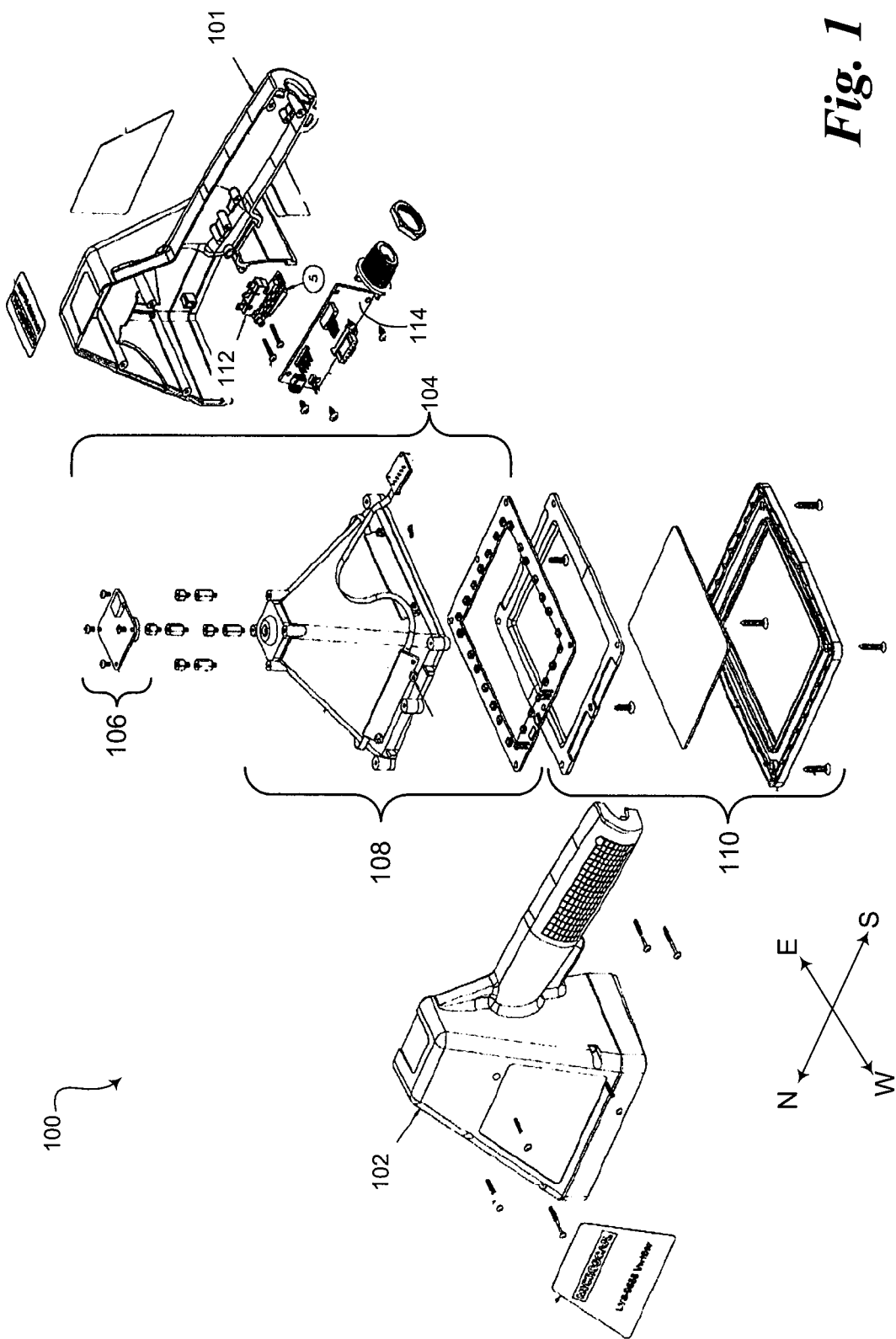
FIG. 1 is an exploded view of an embodiment of a handheld symbology-reading device.

FIG. 1 illustrates an embodiment of an optical symbology reader 100. Reader 100 includes a housing with two halves 101 and 102 that come together to form a partial enclosure for the interior assembly 104. Additional components 110 complete the housing to fully enclose interior assembly 104 within. In an embodiment, the back side of the housing can have a video monitor (not shown) so it is easier for the user to target the label. In an embodiment, there can be a red LED, a yellow LED, and a green LED on the back of the housing that will indicate verification results in real-time. This will keep the user from having to view the monitor screen.

A controller 114 is contained within the housing and is communicatively coupled to camera assembly 106 and illuminator 108. Controller 114 includes a processor, memory, storage, and instructions stored thereon that allow it to control the operation of camera assembly 106 and illuminator 108. Controller 104 can also include a communication interface and associated instructions or logic to allow reader 100 to communicate, uni-directionally or bi-directionally, with a remote device such as a computer (see FIG. 5). Software on controller 114 can be designed to perform functions such as automatically find a DPM symbol within a targeted field of view and cycles through the various lighting modes, looking for the best results. Software then automatically zooms in on and magnifies the image of the DPM symbol for better observation of bar code quality.

A trigger 112 can mounted inside the housing but extends partially outside the housing so that it can be used by an operator to activate or deactivate reader 100 or parts thereof. In an embodiment, trigger 112 can be used to activate and deactivate the illuminator, and activate and de-activate the camera 106. For instance, in one embodiment the trigger has a position that activates only the illuminator and a position that simultaneously activates the illuminator and the camera. For embodiments that use a hands-free platform, trigger 112 is not required. In other embodiments, reader 100 can be activated by keyboard commands, for instance when the reader is coupled to a computer (see FIG. 5).

As a reference for discussing embodiments of symbology reader 100 and its parts an orthogonal coordinate system, with north (N) and south (S) along one axis and east (E) and west (W) along an orthogonal axis, is shown in the drawing. As shown, N points away from the user, S points toward the user in the direction of the handle formed by halves 101 and 102 and E and W point to the right and left as shown. This coordinate system is used below to describe the orientation and activation of various elements of reader 100. In other embodiments, other coordinate systems could be used.

Figure 2:
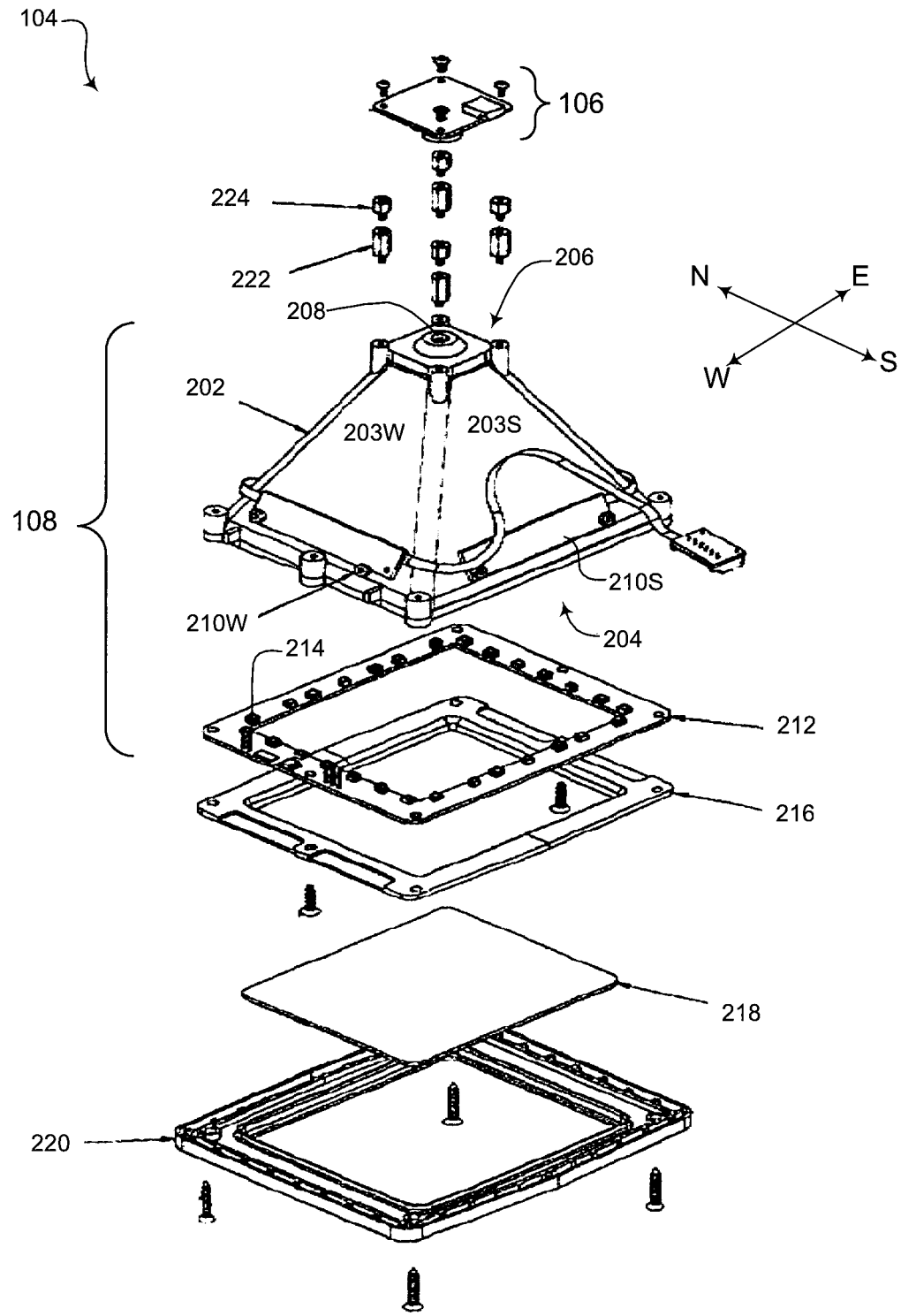
FIG. 2 is an exploded view of an embodiment of an interior assembly used in the handheld symbology-reading device of FIG. 1.

FIG. 2 illustrates an embodiment of interior assembly 104, which includes illuminator 108 and camera assembly 106. Illuminator 108 includes an illumination dome 202 shaped like a truncated quadrilateral pyramid i.e., a truncated pyramid with a quadrilateral base and, as a result of truncation, a quadrilateral top. Dome 202 includes a wide end 204 that forms the base of the truncated pyramid and through which illumination emerges, and a narrow end 206 that forms the top of the truncated pyramid and has a camera hole 208. Four sidewalls 203 a north sidewall 203N, a south sidewall 203S, an east sidewall 203E and a west sidewall 203W extend between the wide and narrow ends of dome 202, although only sidewalls 203W and 203S are visible in the drawing because of its orientation (but see FIG. 3C). Because of the truncation of the pyramid, sidewalls 203 are substantially trapezoidal.

A set of low-angle lights 210 is positioned in each of the four sidewalls 203. Each set of low-angle lights includes one or more individual light sources positioned in a substantially straight line parallel to a plane formed by wide end 204. In the illustrated embodiment, then, there are four sets of low-angle lights: north set 210N, south set 210S, east set 210E, and west set 210W, although only sets 210W and 210S are visible in the drawing because of its orientation (but see FIG. 3C). The low-angle light sets 210 are positioned in holes in each sidewall 203 such that they direct their light toward the interior of dome 202 (see FIGS. 3A-3B). In one embodiment, individual light sources in low angle light sets 210 can be light-emitting diodes (LEDs), but in other embodiments other types of light sources can be used. In still other embodiments not all the individual low-angle light sources need be of the same type.

Figure 3A:
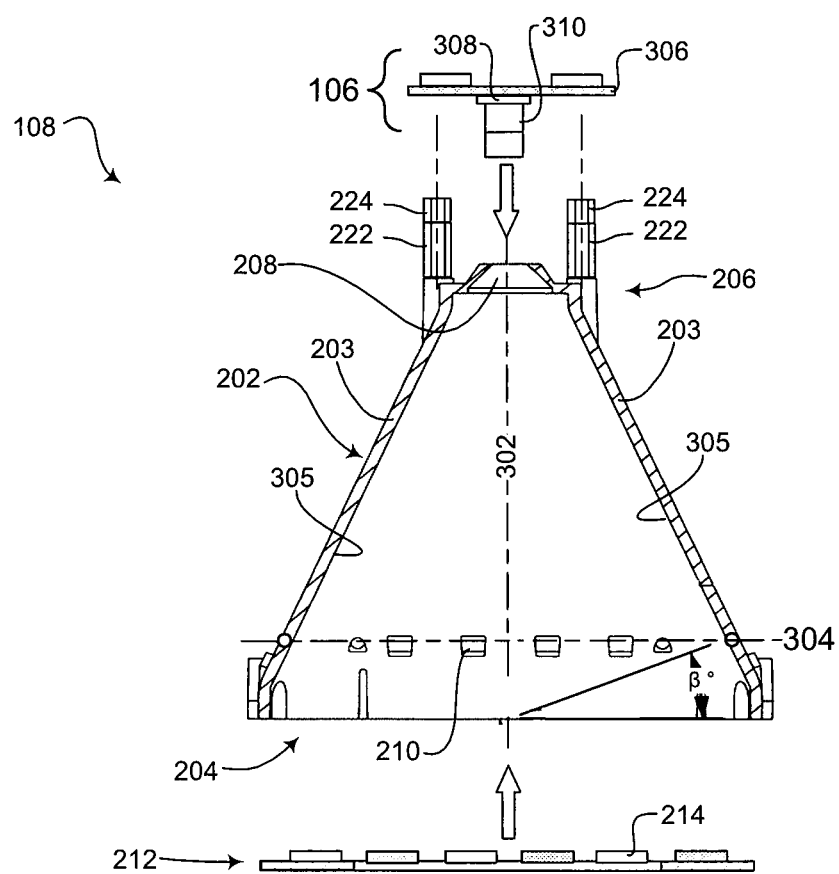
FIGS. 3A-3B are side cross-sections of an embodiment of the illumination dome and the camera assembly in their unassembled and assembled states, respectively.
Figure 3B:
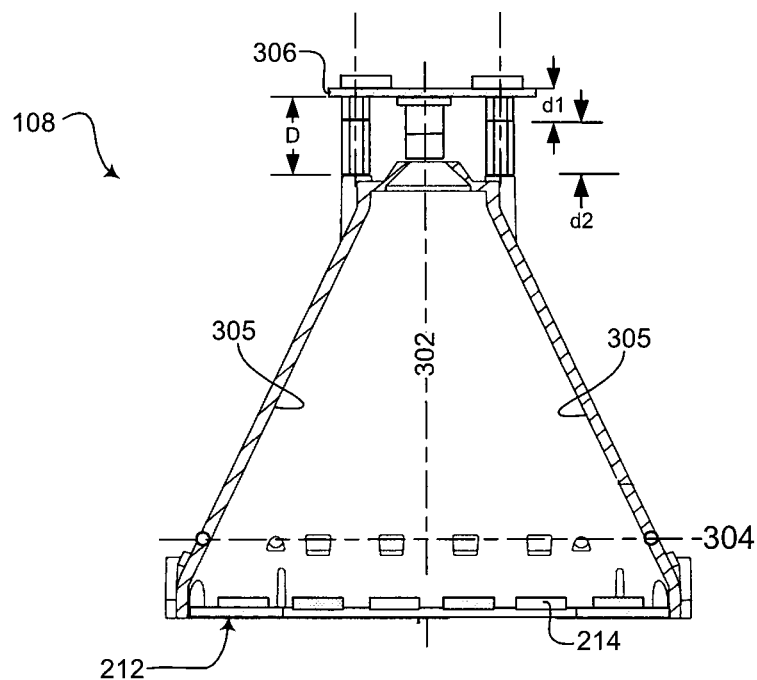

A dome light assembly 212 is positioned around the perimeter of wide and 204 of dome 202 so that the dome lights 214 direct light into the interior of dome 202 (see FIGS. 3A-3B). Details of dome light assembly 212 are described below in connection with FIG. 4.

A window 218 is positioned over the opening in dome light assembly 212 to protect the interior of dome 202, for instance by preventing entry of foreign objects. In one embodiment window 218 can be transparent, but in other embodiments it can have a color such as red or green. In another embodiment, window 218 can be interchangeable by the user. Frame 216 can be used to keep dome light assembly 212 in place, and frame 218 keeps window 218 in place.

Camera assembly 106 is coupled to narrow end 206 with four fasteners and with standoffs 222 and 224 on each fastener. The camera assembly 106 is also optically coupled to camera hole 208 in narrow end 206.

FIGS. 3A-3B together illustrate side views of illuminator 108 and camera assembly 106; FIG. 3A is an exploded view, FIG. 3B an assembled view. Dome 202 includes an optical axis 302 that is substantially aligned with the center of camera hole 208 and normal to planes formed by wide end 204 and narrow end 206. Within dome 202 each sidewall 203 has an interior side 305. In one embodiment, the interior side 305 of each sidewall 203 is diffusive that is, reflected light from these surfaces will be diffuse.

A set of one or more low angle lights 210 is positioned in each sidewall 203 along a line 304. The low-angle lights in each set subtend an angle β where optical axis 302 intersects a plane formed by wide end 204. In one embodiment, β is substantially 30° (e.g., 30+/–3°), but in other embodiments β can have a different value.

Dome-light assembly 212 is inserted in the direction of optical axis 302 such that it fits around the perimeter of wide end 204. With dome light assembly 212 thus positioned, dome lights 214 in the assembly direct light into the interior of dome 202, where diffusive interior surfaces 305 diffuse the light and redirected it out the wide end 204 through window 218.

In operation low-angle light sets 210 and the dome lights can be activated in various combinations:

Red Dome Lights (lights on light tray 212, pointing toward the interior of dome 202).

White Dome Lights (lights on light tray 212, pointing toward the interior of dome 202).

North low-angle light set.

East low-angle light set.

South low-angle light set.

West low-angle light set.

North and South low-angle light sets.

East and West low-angle light sets.

North and South and East and West low-angle light sets.

In one embodiment, software is programmed to cycle through all the lighting combinations and chooses the mode which provides the best results:

Camera assembly 106 includes a substrate 306 that in one embodiment can be a printed circuit board. An image sensor 308 is mounted on circuit board 306, and optics 310 are coupled mechanically coupled the circuit board 308 and optically coupled to image sensor 308. In one embodiment, camera assembly 106 can be a CAM200-16 with a 16 mm lens and a target field of view (FOV) of substantially 1.35 inches by 1.00 inches.

Camera assembly 106 is coupled to narrow end 206 of dome 202 with fasteners inserted through standoffs 222 and 224. Standoffs 222 and 224 are used to maintain proper spacing D between substrate 306 and narrow end 206. In the illustrated embodiment each fastener has two standoffs of thicknesses d1 and d2, such that d1+d2=D. In a particular embodiment where camera assembly 106 includes a 16 mm lens, d1 is $^{11}/_{32}$ inch and d2 is ¾ inch. But in other embodiments a different number of standoffs per fastener than shown can be used. By a proper combination of standoff spacing D and the focal length of optics 310, optical symbology reader 100 can be made to correctly read a variety of optical symbologies over a very wide range of sizes from 2 mil (0.002 inches) to several inches in one embodiment.

Figure 3C:
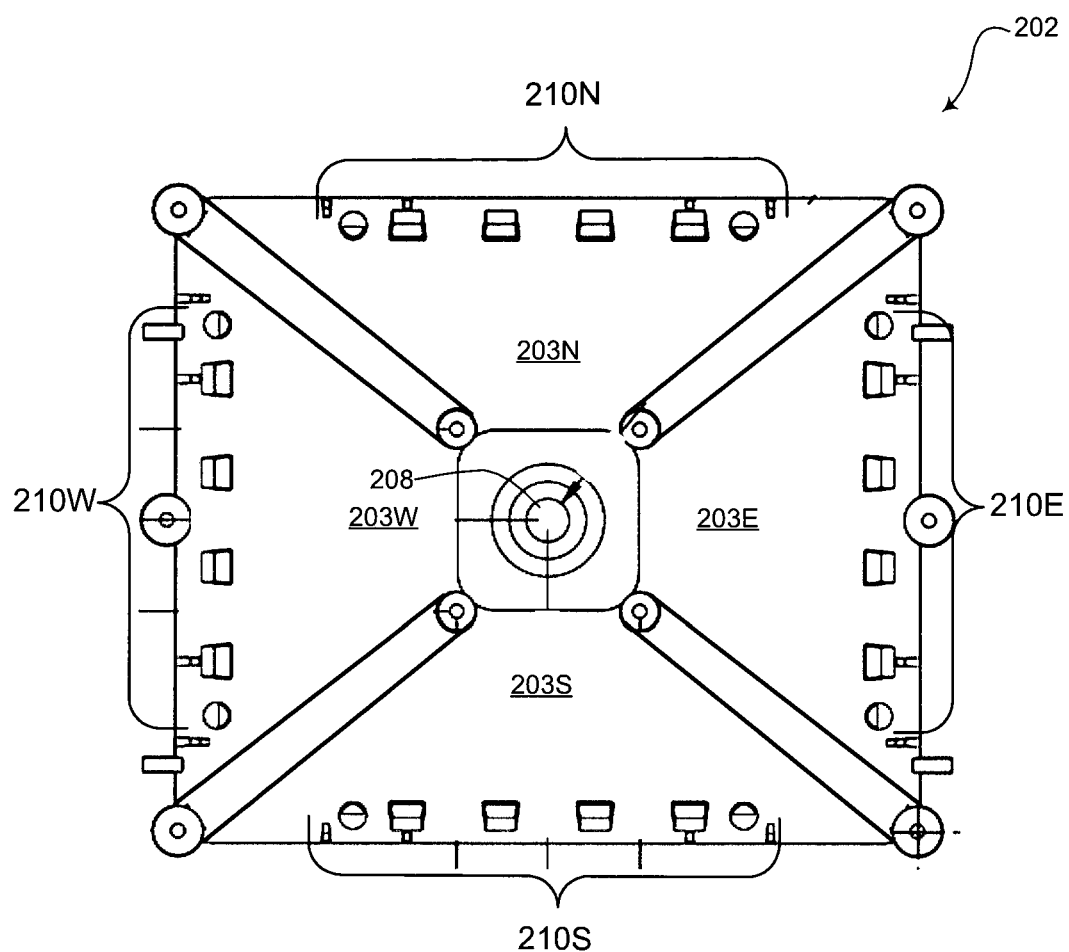
FIG. 3C is a top view of an embodiment of the illumination dome.

FIG. 3C further illustrates the shape and positioning of sidewalls 203 and low-angle light sets 210. Four sidewalls 203 a north sidewall 203N, a south sidewall 203S, an east sidewall 203E and a west sidewall 203W extend between the wide and narrow ends of dome 202. Because of the truncation of the pyramid, sidewalls 203 are substantially trapezoidal. A set of low-angle lights 210 is positioned in each of the four sidewalls 203. Thus, in the illustrated embodiment there are four sets of low-angle lights: north set 210N, south set 210S, east set 210E, and west set 210W. The low-angle light sets 210 are positioned in holes in each sidewall 203 such that they direct their light toward the interior of dome 202 (see FIGS. 3A-3B).

Figure 4:
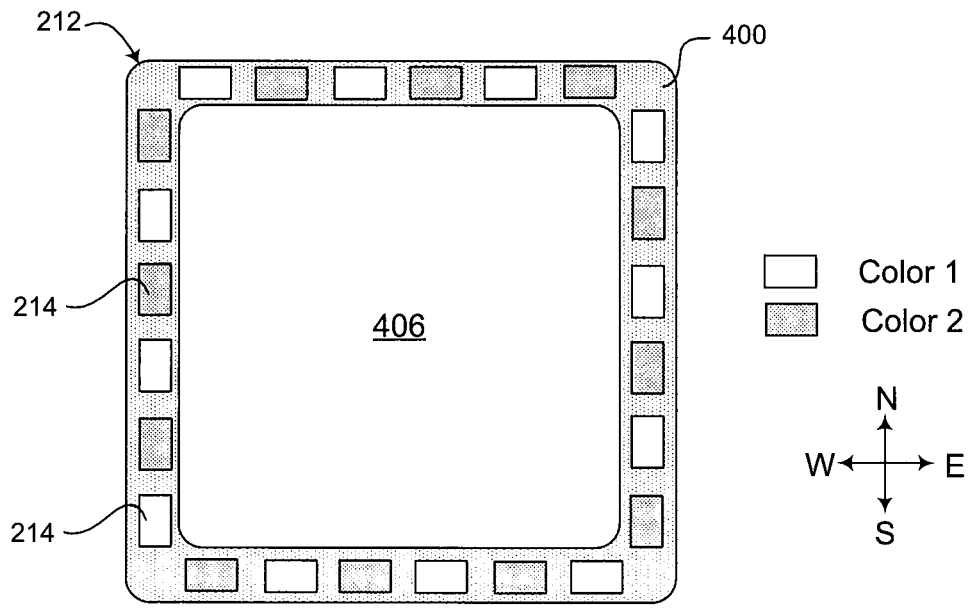
FIG. 4 is a plan view of an embodiment of a dome-light assembly for illuminating the interior of the illumination dome.

FIG. 4 illustrates an embodiment of dome light assembly 212. Dome light tray 212 includes a substrate 400 shaped like a quadrilateral annulus, meaning that it is the result of removing the area of one quadrilateral from a larger quadrilateral of the same shape and same center, leaving open area 406. Dome light sources 214 are positioned along each side of the annulus. In the illustrated embodiment, the dome light sources 214 have two different colors: a first color and a second color. In the illustrated embodiment the first and second colors are positioned in an alternating manner, but other arrangements of the first and second colors can be used in other embodiments. In one embodiment, the first color can be white and the second color can be red (620 nm to 670 nm), with either being activated by software. Other embodiments can use different color pairs. For instance, in other embodiments the dome-light sources can include other visible colors (e.g., green) or even invisible colors (e.g., infrared or ultraviolet). Although not shown in the drawing, electrical connections are formed on annular substrate 400 to allow power to be delivered to the dome-light sources positioned on the substrate.

Figure 5:
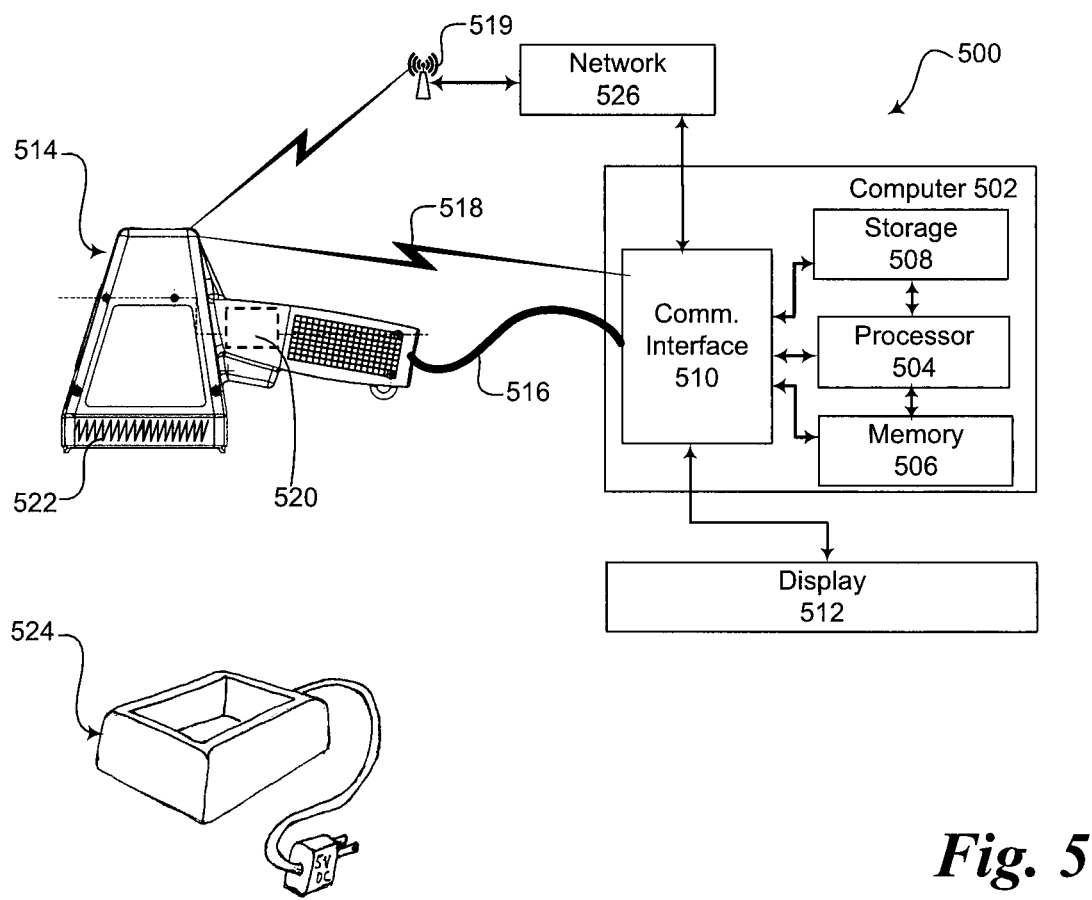
FIG. 5 is a block diagram of an embodiment of a system including an optical symbology reader such as the one shown in FIG. 1.

FIG. 5 illustrates an embodiment of a symbology-reading system 500. System 500 includes a computer 502 coupled to an optical symbology reader such as the one discussed above. Computer 502 includes a processor 504, memory 506, storage 508, and a communication interface 510. A display 512 can be coupled to computer 502 via communication interface 510.

Optical symbology reader 514 can be communicatively coupled to computer 502 via communication interface 510. As used herein, that two elements are "communicatively coupled" means that the two coupled elements can exchange signals or information between themselves in one or both directions. In one embodiment, optical symbology reader 514 or, more specifically, controller 114 within the optical symbology reader (see FIG. 1) can be communicatively coupled to computer 502 by wire or cable 516. In one embodiment, for instance, cable 216 can be a USB 2.0 or USB 3.0 communication line.

In other embodiments reader 514 can be coupled wirelessly to 502, either by a direct wireless connection 518 using protocols such as Bluetooth or Wi-Fi, or wirelessly via Wi-Fi or other wireless protocol using a network work access point 519 coupled to a network 526 that is then coupled to communication interface 510.

The power needed to run optical symbology reader 514 can be provided by computer 502 through cable 516 in one embodiment, in other embodiments, reader 514 can be powered instead by a battery 520. In a battery-powered embodiment, reader 514 can include an electromagnetic coil 522 surrounding the window and electrically coupled to battery 520. To charge battery 520, the reader can be inserted with electromagnetic coil 522 in charging cradle 524. In operation, reader 514 can be configured by user through computer 502 and data read by reader 514 can be exchanged with computer 502.

The above description of embodiments is not intended to be exhaustive or to limit the invention to the described forms. Specific embodiments of, and examples for, the invention are described herein for illustrative purposes, but various modifications are possible.

The invention claimed is:

1. An apparatus comprising:
   an illumination dome including:
      a wide end;
      a narrow end;
      a plurality of sidewalls that extend between the narrow end and the wide end;
      a plurality of dome-light sources positioned around a perimeter of the wide end, wherein the plurality of dome-light sources is configured to provide illumination; and
      one or more sets of low-angle light sources, wherein each set of low-angle light sources is configured to provide illumination;
   a camera coupled to the narrow end of the illumination dome;
   one or more processors; and
   memory storing one or more programs configured for execution by the one or more processors, the one or more programs comprising instructions for:
      illuminating at least a portion of an object that includes a barcode having a 1-dimensional, 2-dimensional, or direct part mark symbology;
      capturing, via the camera, a plurality of images, wherein each image of the plurality of images corresponds to a different illumination configuration of the plurality of dome-light sources and the one or more sets of low-angle light sources;
      selecting an image from the plurality of images according to image quality;
      determining a symbology type of the barcode using the selected image; and
      decoding the barcode in accordance with the determined symbology type.

2. The apparatus of claim 1, wherein the illumination dome is a truncated quadrilateral pyramid including four sidewalls and a set of low-angle light sources is positioned in each of the four sidewalls, the sets of low-angle light sources being designated as north, south, east, and west low-angle light sources.

3. The apparatus of claim 2, wherein the angle subtended by the low-angle light sources is 30±3 degrees.

4. The apparatus of claim 2, further comprising a controller that is communicatively coupled to: (i) the plurality of dome-light sources, (ii) the one or more sets of low-angle light sources, and (iii) the camera, the controller including logic that can activate the low-angle light sources in any one of the following configurations:
   north;
   south;
   east;
   west;
   north and south;
   east and west; and
   north, south, east, and west.

5. The apparatus of claim 1, wherein the plurality of dome-light sources includes dome-light sources of at least two colors.

6. The apparatus of claim 5, further comprising a controller that is communicatively coupled to: (i) the plurality of dome-light sources, (ii) the one or more sets of low-angle light sources, and (iii) the camera, the controller including logic that can sequentially activate the dome-light light sources of a first color and the dome-light sources of a second color.

7. The apparatus of claim 5, wherein the plurality of dome-light sources includes a first set of dome-light sources that is configured to output white light and a second set of dome-light sources that is configured to output red light.

8. The apparatus of claim 7, wherein:
each sidewall has an interior surface on the interior side of the illumination dome; and
the interior surface of each sidewall can diffuse incident light.

9. The apparatus of claim 1, further comprising a trigger having a first position that activates the illumination dome to output illumination light, and a second position that simultaneously activates the illumination dome to output illumination light and the camera to capture one or more images.

10. The apparatus of claim 1, wherein the apparatus has a field-of-view that is at least 2 inches wide.

11. The apparatus of claim 1, wherein:
the object has at least one surface that is deformable and the barcode is disposed on the deformable surface;
the illumination dome further includes a window located at the wide end of the illumination dome;
the window and the plurality of sidewalls form an interior of the illumination dome; and
the window is configured to flatten the deformable surface of the object and prevent the deformable surface of the object from entering the interior of the illumination dome.

12. The apparatus of claim 1, wherein the barcode has at least one dimension that is at least 2 inches.

13. A method for reading bar codes:
at a device comprising an illumination dome that includes a plurality of dome-light sources and one or more sets of low-angle light sources:
receiving one or more objects, each object including a barcode having one of a 1-dimensional, a 2-dimensional, or direct park mark symbology;
activating one or more dome-light sources of the plurality of dome-light sources and/or one or more low-angle light sources of the one or more sets of low-angle light sources to illuminate the barcode;
capturing, via a camera coupled to the illumination dome, a plurality of images, wherein each image of the plurality of images corresponds to a different illumination configuration of the plurality of dome-light sources and the one or more sets of low-angle light sources;
selecting an image from the plurality of images according to image quality;
determining a symbology type of the barcode using the selected image; and
decoding the barcode in accordance with the determined symbology type.

14. The method of claim 13, wherein:
a respective set of low-angle light sources is positioned in a respective sidewall;
the illumination dome includes four sidewalls;
the sets of low-angle light sources are designated as north, south, east, and west low-angle light sets; and
the plurality of illumination configurations is selected from the group of:
north;
south;
east;
west;
north and south;
east and west; and
north, south, east, and west.

15. The method of claim 13, further comprising automatically detecting a position of the barcode.

16. The method of claim 13, further comprising determining a quality of the barcode.

17. The method of claim 13, further comprising:
selecting an illumination configuration of the plurality of dome-light sources and the one or more sets of low-angle light sources;
illuminating the one or more objects using the selected illumination configuration; and
recording, via the camera, a video of the one or more objects.

18. The method of claim 13, further comprising:
at a first time, determining a first barcode on a first object; and
at a second time distinct from the first time, determining a second barcode on a second object, wherein:
the first barcode has one of a 1-dimensional, a 2-dimensional, or direct park mark symbology;
the second barcode has one of a 1-dimensional, a 2-dimensional, or direct park mark symbology; and
the second barcode has a symbology that is different from a symbology of the first barcode.

* * * * *